Jan. 12, 1971 C. I. A. BERGSTROM 3,554,574
ARRANGEMENT IN THE SUSPENSION SYSTEM OF TRACTION VEHICLES FOR SEMITRAILERS

Filed Oct. 1, 1968 — 2 Sheets-Sheet 1

INVENTOR.
Carl Ingvar Andreas Bergström
BY
Pierce, Scheffler & Parker
Attorneys

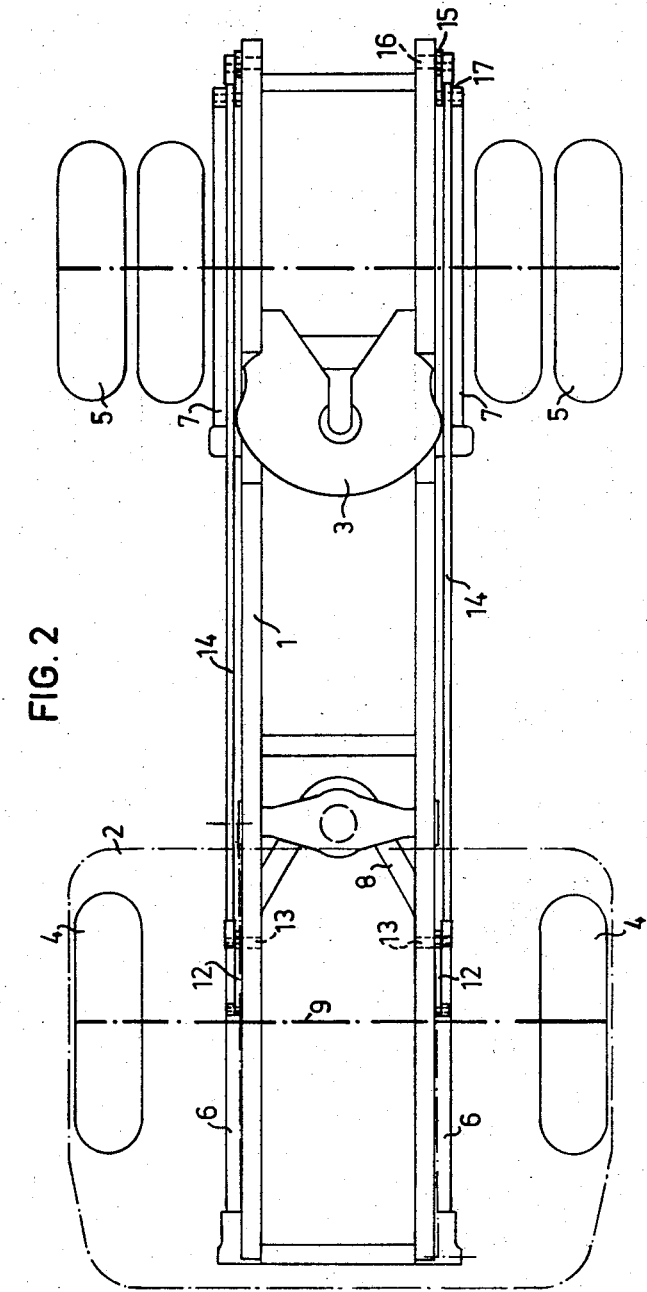

United States Patent Office 3,554,574
Patented Jan. 12, 1971

3,554,574
ARRANGEMENT IN THE SUSPENSION SYSTEM
OF TRACTION VEHICLES FOR SEMITRAILERS
Carl Ingvar Andreas Bergstrom, Frolunda, Sweden, assignor to Aktiebolaget Volvo, a body corporate of Sweden
Filed Oct. 1, 1968, Ser. No. 764,056
Claims priority, application Sweden, Oct. 17, 1967, 14,206/67
Int. Cl. B60g 19/02
U.S. Cl. 280—104          2 Claims

ABSTRACT OF THE DISCLOSURE

A suspension system for a traction vehicle of semitrailers, said traction vehicle being provided with a turntable for taking up the load from the trailer, the front axle and the springs of the rear axle being interconnected by means of coupling means for transmitting vertical movements of the front wheel to the rear wheel in the opposite direction, said coupling means being such that the movements of the wheels are proportional to the distance of the turntable from the respective axles.

---

Figure 1:
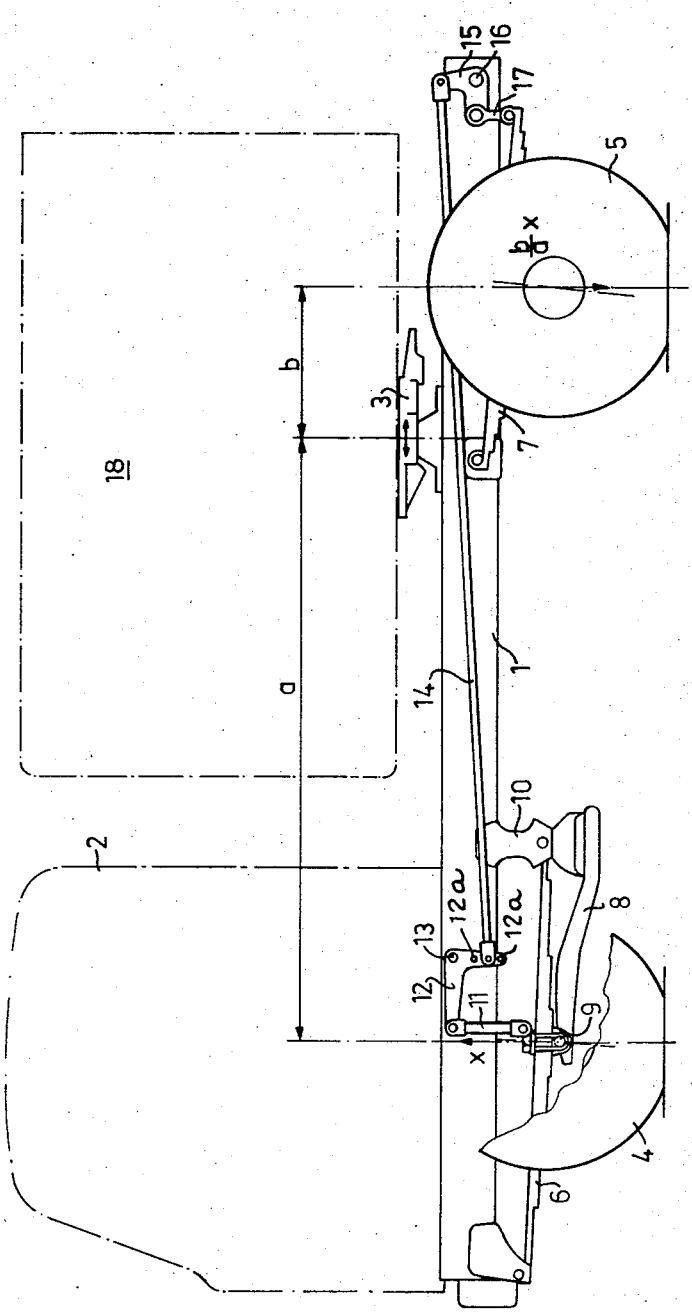

The present invention relates to an arrangement in the suspension system of vehicles for road transport, more specifically traction vehicles for so-called semitrailers.

It is only natural that for road transport one wants to make full use of the highest permissible axle load, which especially in connection with traction vehicles for semitrailers involves suspension problems affecting the riding comfort in the driving compartment. The traction vehicle is in itself of comparatively light weight, and in order to suspend its front part with the driver's cabin a fairly soft front suspension can be used. The main load is transferred from the trailer via a turntable located near the rear axle of the traction vehicle, and the springs of the suspension assembly of said rear axle are therefore dimensioned to take up substantially the entire load from the trailer, and therefore the maximum permissible axle thrust can make necessary a limitation of the trailer weight. In order to avoid this, one can locate the turntable at a longer distance from the rear axle in the direction towards the front axle so that the latter one will take up part of the load of the trailer, but in case no special steps are taken, the front suspension must be reinforced correspondingly which involves a stiffer suspension resulting in vertical oscillations of high frequency which can be very troublesome for the driver.

In vehicles where the suspension is adapted for the best riding comfort with correspondingly soft front as well as rear springs, pitching movements very easily occur when braking, and in order to avoid such movements it has been suggested to couple together the rear and front axles of the vehicle in such a way that for example a movement of the front axle in upward direction is transmitted to the rear axle as a movement in downward direction of the latter one. Said coupling can be of mechanical, hydraulical or pneumatical type, and different designs are known.

It is an object of the present invention to shift part of the load of the trailer from the rear axle of the traction vehicle to its front axle thereby to keep the axle pressure within the permissible limit at a total load which otherwise would have resulted in a too high axle thrust, and at the same time maintain a soft suspension at the front axle of the traction vehicle with the result of good riding comfort in its driver's cabin.

The invention is characterized in that the front axle and the springs of the rear axle are interconnected by means of a system for coupling together the vertical movements of the wheels in such a manner that a certain movement of one wheel in one direction is transmitted to the other wheel in the opposite direction, the size of the movements being proportional to the distance of the turntable from the respective axles.

The distance of the turntable from the respective axles as mentioned above determines how great a part of the trailer load affecting the traction vehicle is loading each respective axle, and in order to satisfy different needs with respect to the axle thrust the turntable is suitably displaceable. At the same time the gear ratio of the movements between the axles should be adjustable in order to fulfill the condition mentioned above, which for example can be done by changing the length of one or more arms of the levers of the coupling system.

By the arrangement according to the invention the front part of the vehicle with the driver's cabin can be cushioned by means of a suspension adjusted to the weight of said part independently of the additional load from the trailer which will result in an improved riding comfort in the driver's compartment compared to traction vehicles of the prior art.

One embodiment of the invention will be described with reference to the accompanying drawings, in which:

FIG. 1 is a schematic side elevational view of a traction vehicle for a semitrailer with an arrangement in accordance with the invention, and FIG. 2 is a top view of the traction vehicle in FIG. 1.

A traction vehicle for a semitrailer has a chassis 1 comprising longitudinal beams and cross bars on which a driver's cabin 2 suitably with built-in motor section is mounted, and on said chassis a turntable 3 is also mounted which is intended to support the front part of a trailer 18, said turntable constituting a pivot for the trailer. The front and rear wheels 4 and 5, respectively, of the traction vehicle are suspended by means of longitudinally extending leaf spring assemblies 6 and 7, respectively, the front ends of which are hingedly connected to the chassis 1 while the rear ends are movable. The spring 6 of the front wheel 4 is comparatively soft and has a resilient characteristic adjusted to the effect that the riding comfort in the driver's cabin 2 shall be the best one possible while the spring 7 of the rear wheel 5 is dimensioned to take up the greatest permissible load from the trailer. A moment arm 8 of angular shape is at its ends connected with the axle 9 of the front wheel 4 and the center of said moment arm is articulated to a cross bar 10 of the chassis 1.

The leaf springs 6 and 7, respectively, can be substituted by helicoid springs or other suspension means of equivalent characteristics.

The front axle 9 of the traction vehicle and the rear end of the rear spring 7 are connected by means of a linkage as follows. A substantially vertical link 11 has at one end a hinged connection to the front axle 9, the other end of said link likewise having a hinged connection to one of the arms of a bell crank lever 12 which is pivotally mounted on a pivot 13 on the chassis 1. The other arm of the bell crank lever 12 is hingedly connected to a tension rod 14 extending along the chassis 1 to one of the arms of another bell crank lever 15 which is pivotally mounted on a pivot 16 on the rear part of the chassis, the other arm of said bell crank lever 15 being connected to a shackle 17 pivotally mounted to the rear end of the spring 7. The bell crank levers 12 and 15 are of such a shape that an upward movement of the front axle 9 is transmitted to the rear spring 7 as a movement in downward direction. Furthermore, the lengths of the arms of the bell crank levers are chosen to the effect that linkage produces a predetermined gear ratio of the movements of the wheel assemblies. If $b$ is the distance of the turntable 3 to the rear axle and $a$ its distance to the front axle, then the gear ratio of the linkage shall have such a value that a certain movement of the front wheel produces a movement of the rear wheel in the opposite direction, the ratio being $b/a$. Because the distances $a$ and $b$ are varied according to the displacement of the turntable 3, it must be possible to change the gear ratio so that the condition always is maintained which by way of example can be done by shifting the mounting point of the tension rod 14 to one arm of the bell crank lever 12 towards or away from the pivot 13 by means of holes 12a.

The arrangement described constitutes only an example of a solution of the suspension problem of a semitrailer and other embodiments are possible within the scope of the invention. Thus, the mechanical linkage can be substituted by a closed hydraulic piston and cylinder system with piston areas dimensioned to transmit the movements of the wheel assemblies in accordance with a predetermined gear ratio.

What I claim is:

1. A suspension system for a traction vehicle of semi-trailers comprising front and rear wheel and axle assemblies, a supported structure, a turntable on said structure adapted to take up the load from the trailer, springing means between the respective wheel assemblies and said structure and coupling means for transmitting vertical movements of one of said wheel assemblies to the other wheel assembly in the opposite direction, said coupling means comprising bell crank levers pivotally mounted on said structure, one arm of each of said bell crank levers being hingedly connected respectively to the front axle and the rear wheel spring, and a tension bar connecting the other arms of said bell crank levers, the total ratio of the linkage of the coupling means being equal to the ratio of the distance of the respective axles from the centre of the turntable.

2. A suspension system as claimed in claim 1 and further comprising means for varying the length of one arm of one of the bell crank levers connected to said tension bars by adjusting the fixing point of the tension bar in order to vary the ratio of the movements of the front and rear wheels on each side according to different positions of the turntable with respect to said front and rear wheel assemblies.

References Cited

UNITED STATES PATENTS 1,437,800  12/1922  Garver _____ 280—104X

PHILIP GOODMAN, Primary Examiner

U.S. Cl. X.R.

280—405